United States Patent
Kamperman et al.

(10) Patent No.: US 10,528,704 B2
(45) Date of Patent: Jan. 7, 2020

(54) DIVIDED RIGHTS IN AUTHORIZED DOMAIN

(75) Inventors: Franciscus Lucas Antonius Johannes Kamperman, Eindhoven (NL); Geert Jan Schrijen, Eindhoven (NL); Sebastiaan Antonius Fransiscus Arnoldus Van Den Heuvel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2583 days.

(21) Appl. No.: 10/539,358

(22) PCT Filed: Nov. 21, 2003

(86) PCT No.: PCT/IB03/05725
§ 371 (c)(1),
(2), (4) Date: Jun. 15, 2005

(87) PCT Pub. No.: WO2004/059451
PCT Pub. Date: Jul. 15, 2004

(65) Prior Publication Data
US 2006/0212400 A1    Sep. 21, 2006

(30) Foreign Application Priority Data
Dec. 30, 2002 (EP) .................................... 02080568

(51) Int. Cl.
*G06F 21/00* (2013.01)
*G06F 7/04* (2006.01)
(Continued)

(52) U.S. Cl.
CPC .................... *G06F 21/10* (2013.01)

(58) Field of Classification Search
CPC ..................................................... G06F 21/10
(Continued)

(56) References Cited

U.S. PATENT DOCUMENTS

| 6,034,832 | A  |   | 3/2000  | Ichiura et al. |
| 6,976,009 | B2 | * | 12/2005 | Tadayon et al. ............... 705/51 |

(Continued)

FOREIGN PATENT DOCUMENTS

| EP | 0715246 A1 | 6/1996 |
| EP | 0813194 A2 | 12/1997 |

(Continued)

OTHER PUBLICATIONS

Perritt, Jr, "Knowbots, Permission Headers and Contract Law", Technological Strategies for Protecting Intellectualproperty in the Networked Multimedia Environment, XP-002233403, 1993, (Year: 1993).*

(Continued)

*Primary Examiner* — Samica L Norman
*Assistant Examiner* — Murali K Dega

(57) ABSTRACT

To ensure that digital rights cannot be forged or tampered with, they can be digitally signed. However, this means that updating the digital rights is no longer possible, as this would invalidate the digital signature. The present invention proposes that the issuer of digital rights issues rights which are signed in elementary pieces, rather than as a whole. Rather than issuing a right to play back a piece of content three times, the provider issues for example three rights to play back the content once in a particular AD, of which two may be transferred to other domains. The digital rights are individually protected by signatures and it is no longer possible to forge digital rights. As an enhancement the rights that can be transferred are indicated as such and stored securely to prevent tampering. When the right is transferred, it must be signed by the person who originally received it.

63 Claims, 8 Drawing Sheets

Figure 1:
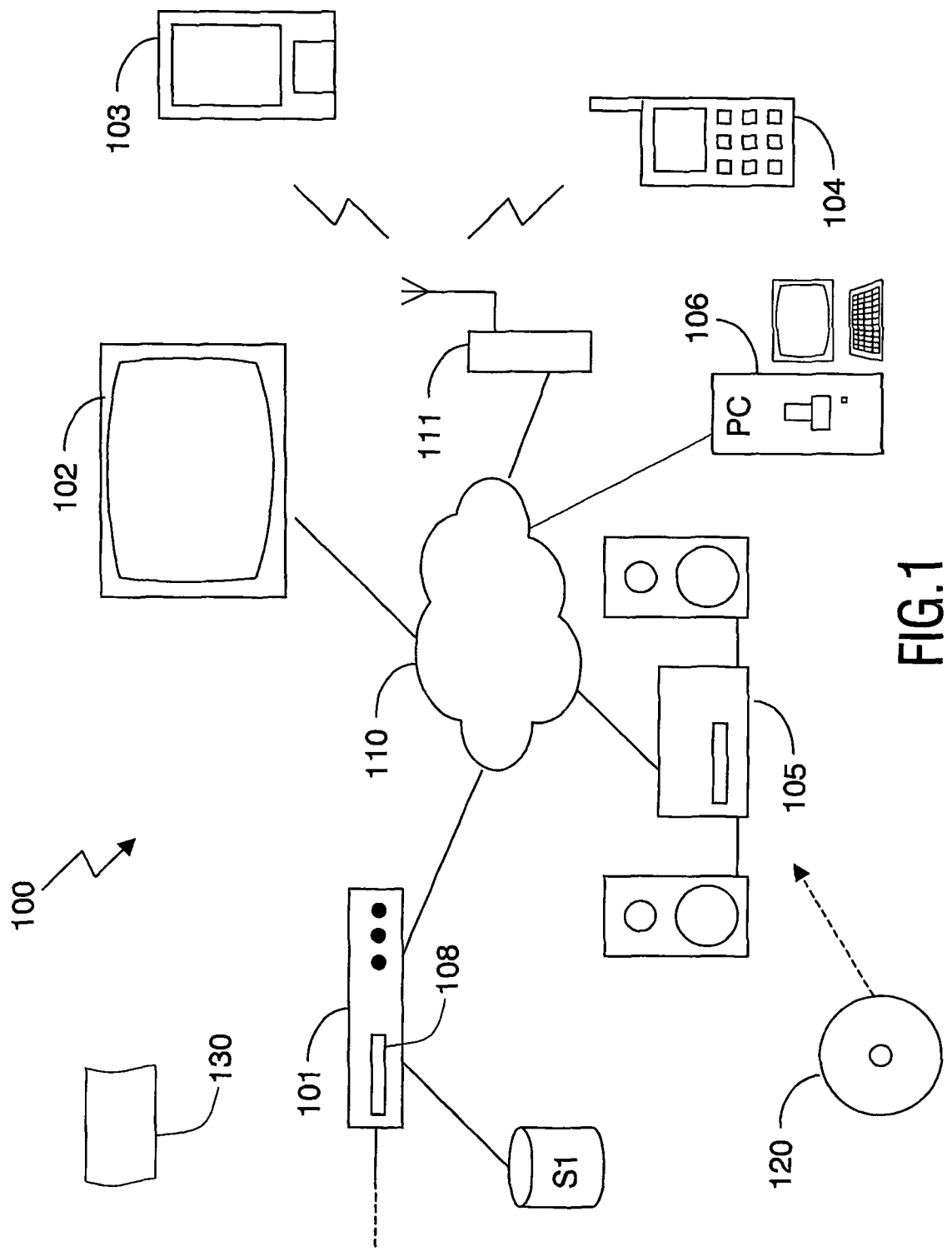

(51) Int. Cl.
*G06F 15/16* (2006.01)
*G06F 17/30* (2006.01)
*H04L 29/06* (2006.01)
*G06Q 20/00* (2012.01)
*G06F 21/10* (2013.01)

(58) Field of Classification Search
USPC .................................................. 705/1–79
See application file for complete search history.

(56) References Cited

U.S. PATENT DOCUMENTS

| | | | | |
|---|---|---|---|---|
| 7,017,189 | B1* | 3/2006 | DeMello et al. | 726/26 |
| 7,260,721 | B2 | 8/2007 | Tanaka et al. | |
| 7,353,541 | B1* | 4/2008 | Ishibashi et al. | 726/26 |
| 7,509,421 | B2* | 3/2009 | Lambert | G06F 21/10 709/217 |
| 2002/0016922 | A1* | 2/2002 | Richards | G06F 21/10 726/3 |
| 2002/0082997 | A1* | 6/2002 | Kobata | G06F 21/10 705/51 |
| 2003/0014315 | A1* | 1/2003 | Jaalinoja | G06Q 20/045 705/18 |
| 2003/0028622 | A1* | 2/2003 | Inoue et al. | 709/219 |
| 2003/0084306 | A1* | 5/2003 | Abburi et al. | 713/188 |
| 2003/0097564 | A1* | 5/2003 | Tewari et al. | 713/171 |
| 2003/0105720 | A1 | 6/2003 | Ishibashi | |
| 2003/0120604 | A1 | 6/2003 | Yokota et al. | |
| 2003/0217163 | A1* | 11/2003 | Lagerweij et al. | 709/229 |
| 2004/0003270 | A1* | 1/2004 | Bourne | G06F 21/10 713/193 |
| 2004/0054678 | A1* | 3/2004 | Okamoto et al. | 707/100 |
| 2004/0158731 | A1* | 8/2004 | Narin | G06F 21/6263 726/27 |
| 2005/0071280 | A1* | 3/2005 | Irwin | H04L 9/0825 705/59 |
| 2006/0036554 | A1* | 2/2006 | Schrock et al. | 705/75 |

FOREIGN PATENT DOCUMENTS

| | | |
|---|---|---|
| EP | 0930556 A2 | 7/1999 |
| EP | 1130491 A1 | 9/2001 |
| EP | 1130491 B1 | 9/2001 |
| JP | 103745 A | 1/1998 |
| JP | 2001075868 A | 3/2001 |
| JP | 2001256413 A | 9/2001 |
| JP | 2002359616 A | 12/2002 |
| WO | 0163387 A2 | 8/2001 |
| WO | 0201335 A2 | 1/2002 |
| WO | 2004038568 A2 | 5/2004 |

OTHER PUBLICATIONS

F. L. A. J. Kamperman, et al: Digital Rights Management in Home Networks, Philips Research, IBC 2001, vol. 1, pp. 70-77.

Perritt, Jr, "Knowbots, Permission Headers and Contract Law", Technological Strategies for Protecting Intellectual Property in the Networked Multimedia Environment, XP-002233403, 1993, pp. 1-37.

History of DVB, Digital Video Braodcasting, www.dvb.org, Downloaded Jun. 15, 2015, pp. 1-6.

TV Anytime, www.tv-anytime.org, Downloaded Jun. 15, 2015, 1 Page.

* cited by examiner

DIVIDED RIGHTS IN AUTHORIZED DOMAIN

The invention relates to a method of controlling access to a content item in a system comprising a set of devices, the method comprising a step of associating at least one usage right with the content item.

The invention further relates to a client system comprising a set of devices, the client system being arranged to perform access control to a content item, with handling means for a usage right associated with the content item.

The invention further relates to a server system being arranged to perform access control to a content item, the server system further associating at least one usage right with the content item.

The invention also relates to a signal for carrying usage rights.

The invention also relates to a device arranged to perform access control to a content item, being able to handle a usage right associated with the content item.

Television and other content is increasingly becoming digital. Also, digital content can easily be transferred between devices which often are able to communicate with each other. This does present the end-user with a user-friendly system, where access to content is no longer limited to a single device, but content can be accessed from any device connected to some kind of (in-home) network.

It also poses a threat to the content owner that its content is copied or transferred unlimitedly. A digital rights management (DRM) system is designed to protect and regulate access to content. For the content owner, who often wants to impose strict rules on digital transfer of content to prevent unlimited digital copying, content protection by a DRM system is an important condition for the acceptance of digital content distribution to consumer households.

In several fora, like CPTWG (Copy Protection Technical Working Group, http://www.cptwg.org), DVB (Digital Video Broadcasting, http://www.dvb.org), and TV-Anytime (http://www.tv-anytime.org), discussions are going on how to make sure that high-valued digital content cannot be redistributed illegally when it is accessed by consumers on devices connected to their in-home network.

In recent discussions within DVB-CPT (Copy Protection Technical module) and TV-Anytime RMP (Rights Management and Protection), the above problems are addressed under the title Authorized Domain (AD). An AD both respects the content provider's and consumer's interest, in the sense that the consumer has freedom to access and distribute the content within the AD, while at the same time the rights of the content owners and service providers are covered by introducing strict import and export rules to prevent unlimited digital copying the content across domains.

The DVB-CPT group has defined an AD as a set of DVB-CPCM (Copy Protection and Copy Management) compliant functional units, that controls the flow of content and the content format. The AD represents an environment of trust for the authorized use of copyrighted content. The AD may consist of several, potentially disconnected, segments of a user's home network. This includes the temporary connection of mobile devices, and virtual "connection" of different network segments (possibly operational at non-overlapping times) by portable media.

An AD offers a consumer unrestricted and uncomplicated access to legally acquired content within the AD. Consumers will expect that they can add devices, rights, and content to the domain. Consumers will also expect that they can access their content anywhere, anytime, and on each of their devices. In addition this may also hold for mobile devices, or for terminals outside the house, such as a television in a hotel room. In addition, users can be added and removed from a domain, for example because they change between households. Other users also expect to have access to the content, for example because they are friends during a visit, or because of fair use provisions.

On the other hand, content providers require strong limitations on content exchange especially via Internet redistribution. Therefore, the rights to content should be clearly defined and protected. For example, in the domain of TV systems, a content right (also called ECM in pay-TV context) describes what is allowed with said content, and a usage right (also called EMM in pay-TV context) authorizes a person to use a certain content right, and can also describe what a user is allowed to do with said content.

Example usage rights are a right to play content, a right to make a one generation copy, etc.

Both content rights and usage rights may also contain cryptographic keys.

For a more extensive introduction to the use of DRM in home networks, see F. L. A. J. Kamperman, S. A. F. A. van den Heuvel, M. H. Verberkt, Digital Rights Management in Home Networks, Philips Research, The Netherlands, IBC 2001 conference publication vol. I, pages 70-77.

It is obvious that content rights and usage rights represent a certain amount of value, and should be protected from unwanted duplication or unauthorized creation. This could be done using secure and encrypted communications and secure storage of these rights, which are only to be handled by tamper resistant software and/or hardware.

Content rights are not personalized, and can hence be transferred together with the content or offered by different servers.

However, usage rights are personalized. Depending on the business model or protection scheme usage rights can be tied to a device, to a medium such as a CD, to an AD, or to a person. The requirement for tamper-resistant handling makes it difficult to freely use or transfer the usage right for example between devices or when traveling.

A better solution is to protect usage rights with a digital signature. The usage right is signed by the content provider or a different authorized source using well-known public key signature technology. In such a solution, the content provider has a private/public key pair. The private key is required in the process of adding a signature to the public right. The private key is kept completely secret by the content provider. The validity of the signature, which protects the integrity of the public right, can be checked using the corresponding public key. Because the usage right is protected by the digital signature, it can be allowed outside tamper resistant environment.

To prevent illegal access to content, the usage right certificate should only be accepted by a (compliant) device if it can be verified (using its public key) that it originates from an authorized source. In addition, other conditions can be checked before accepting a certificate, such as whether the certificate belongs to the AD the right is intended for, or in the case of a person based AD whether the associated person is present.

Some digital usage rights may be usable only a limited number of times, for example a right to play back a piece of content three times, or a right to transfer the content to a different domain two times. This requires that the usage right itself contains a counting or revocation mechanism of some kind that is triggered each time that the right is used.

However, any change due to the implementation of the counting mechanism in the usage right invalidates the signature. The signature can only be computed by the trusted third party, which is clearly a disadvantage.

In addition, the usage right may also contain a right to transfer content a single time to a different domain or user. Such a transfer right needs to be revoked after it has been used. Revocation or deletion of such a transfer right also invalidates the signature of the remaining usage right.

It is an object of the current invention to provide a method which allows that the usage right can be handled without invalidating the digital signature.

This object is thereby realized by a method according to the preamble that the method further comprises decomposing the usage right into a set of partial rights, and subsequently separately signing each one of the set of partial rights, resulting in a corresponding signature.

This method has the advantage that a usage right is now signed in elementary pieces, rather than as a whole. For example, the right to transfer the content to a different domain and the right to play back the content once in a particular AD, are each individually signed. When a partial right is used or transferred, it is still digitally signed, and so are any remaining rights.

An embodiment of the method according to the invention is described in claim 2.

Devices in the system are able to access such a signed partial right, and verify its validity, without requiring access to the complete usage right. Subsequently, the right can be exercised after successful validation.

An embodiment of the method according to the invention is described in claim 4.

Some partial rights can only be exercised a limited number of times, allowing control over the number of times the content item may be accessed. If a right can only be exercised a single time, it has the advantage that it can be separately revoked, deleted, or immediately marked as having been used.

An embodiment of the method according to the invention is described in claim 5.

The device can check revocation of a right before exercising it, thereby increasing the robustness against the use of obsolete rights.

This check, in which a tamper resistant device within the domain can be consulted, allows reliable revocation of rights.

An embodiment of the method according to the invention is described in claim 6.

The system of devices may make up a domain, e.g. as described above, of, for example, devices belonging to members of a single household, or having some other relation between the devices or their owners. Persons can be allowed to enter and leave a domain. Users can be identified for example by a personal smart card.

An embodiment of the method according to the invention is described in claim 9.

At least one device in the domain is allowed to add its signature to the combination of one of the partial rights and information containing at least the identification of itself and/or a different device or domain, validity information (length, type), and subsequently to transfer this right to a different device, possibly being a part of or representing a different domain.

This has the advantage that it is possible to track the history, redistribution channel, and original issuer of a transferred right.

Similarly, a device could be allowed to limit itself to sign the partial right only, as described in claim 10.

An embodiment of the method according to the invention is described in claim 12.

The device that transfers the right can be required to verify the compliance of the device that receives the right. It may also check with a third party whether the receiving device has not been revoked. The receiving device may perform similar checks on the originating device.

An embodiment of the method according to the invention is described in claim 13.

The device that transfers the right to a different device can locally revoke or delete the partial right.

An embodiment of the method according to the invention is described in claim 14.

A type of usage right is introduced, called an offer right, which represents an offer from a content provider. The offer right may contain the promise to transfer upon request a signed usage right from the content provider directly to a third party to be specified at a later stage. This allows the owner of the offer right to "transfer" a usage right at a later stage, while it allows the content provider verification of the usage of the right. Additional restrictions can be introduced, such as a minimum or maximum delay between the offer right and the time of transfer.

The third party can be a different domain, but it could also be one of the devices owned by the user which is not or not always part of the domain. The third party can also be a device owned by someone else, but in current use by the owner of the transfer, for example during a visit, while traveling, or in a hotel room.

It is a further object of the invention to provide a client system according to the preamble where the usage right is a set of individually signed partial rights, and the client system is being arranged to verify individually and handle individually the partial rights.

It is a further object of the invention to provide a server system according to the preamble having means to decompose the usage right into a set of partial rights, the server system further has a signing part being arranged to subsequently separately sign each one of the set of partial rights, and is arranged to bundle the individually signed partial rights into a set.

It is a further object of the invention to provide a signal according to the preamble where the usage rights are split into partial rights, which are individually signed.

It is a further object of the invention to provide a device according to the preamble where the device is further arranged to handle the usage right which has been split into partial rights, each of the partial rights having a digital signature.

Figure 2:
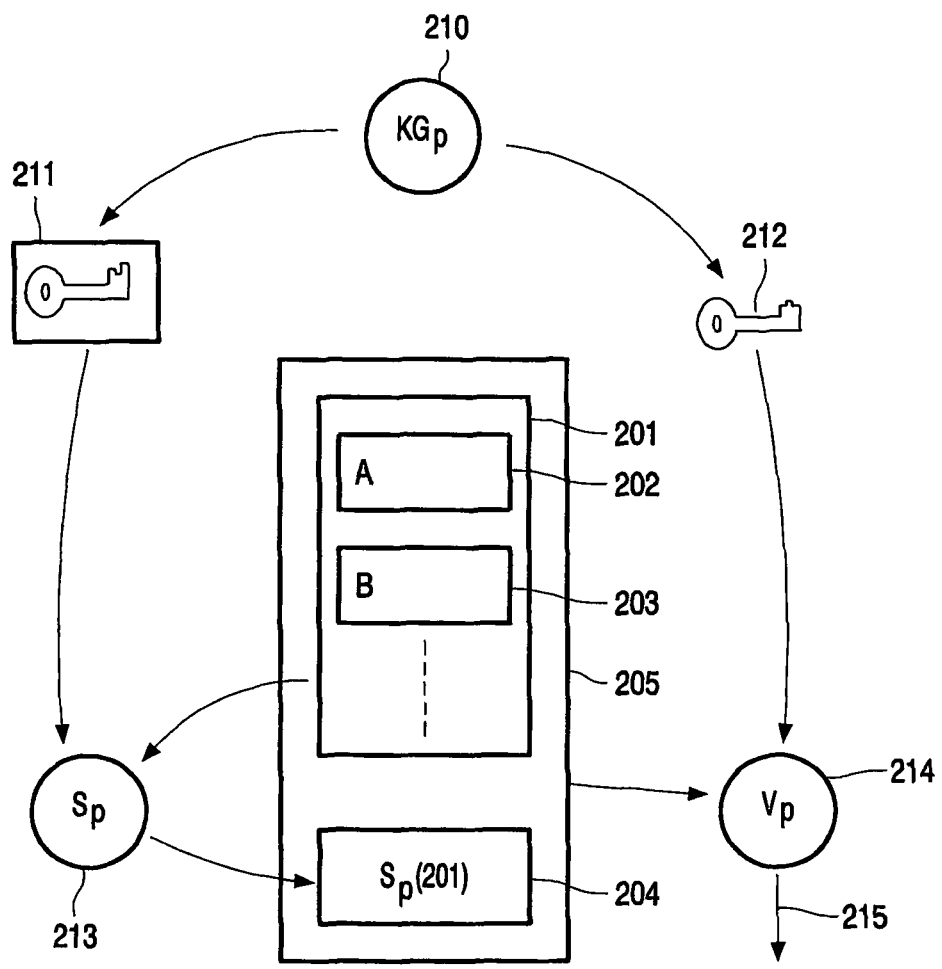
Figure 3:
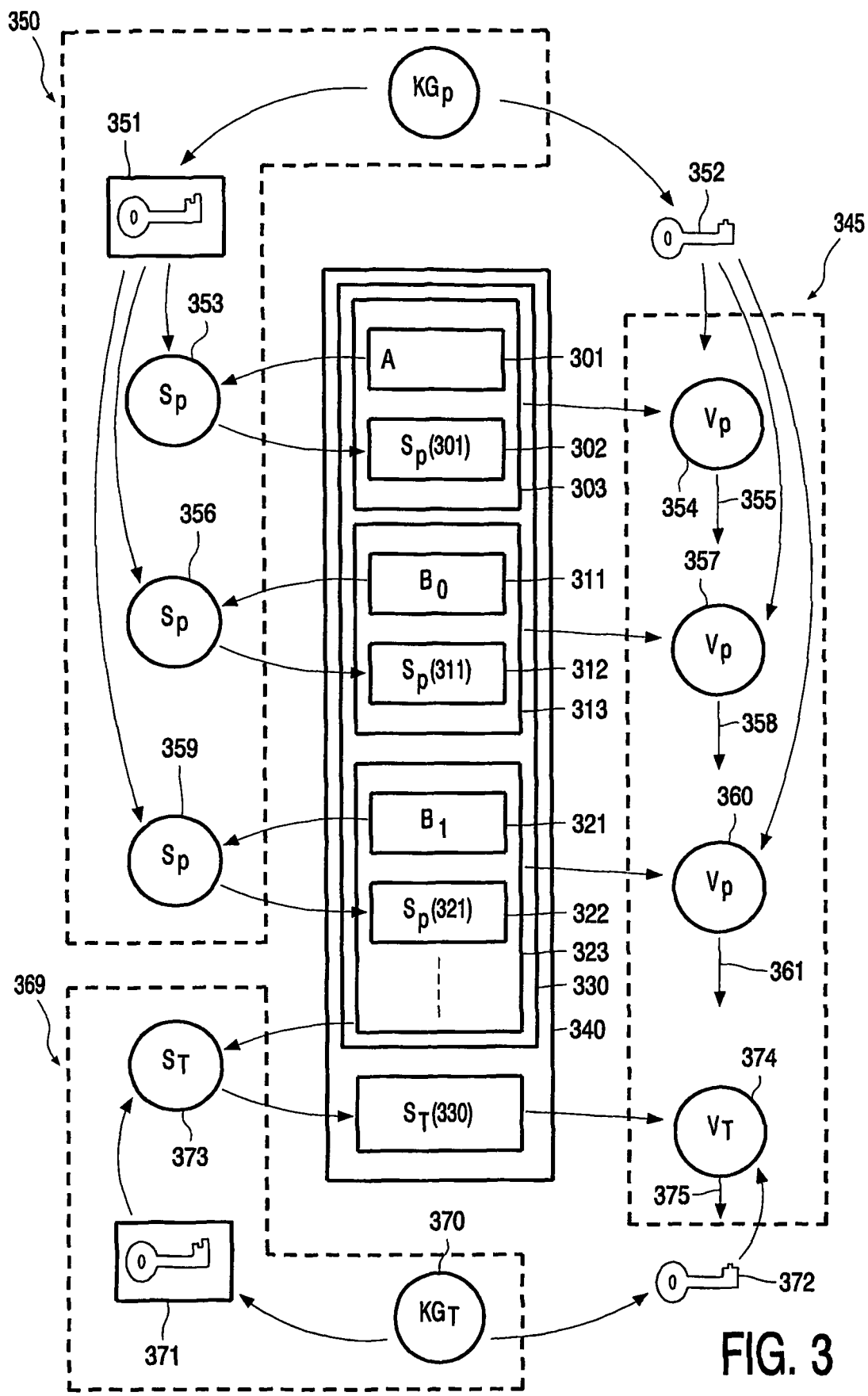
Figure 4:
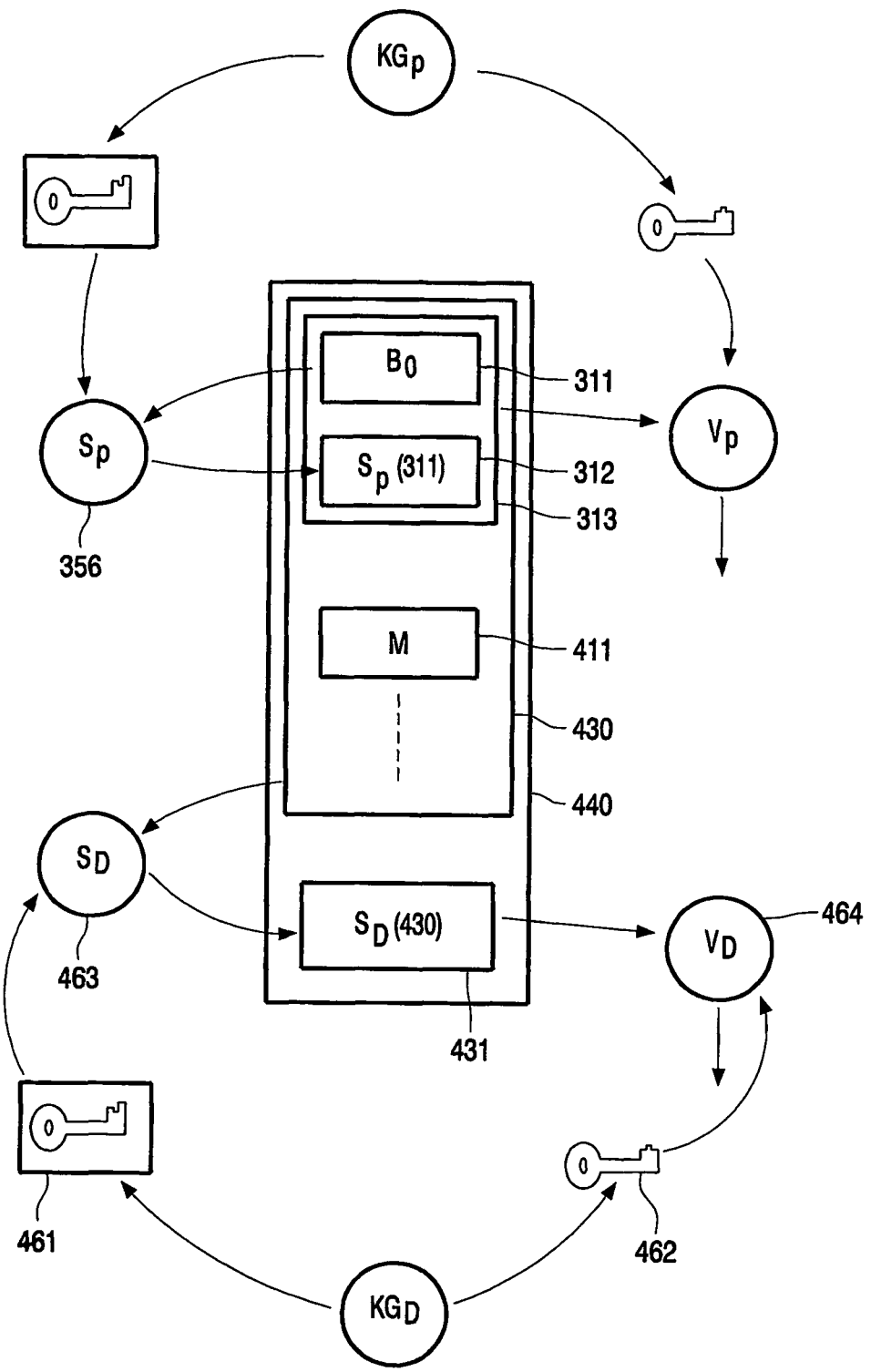
Figure 5:
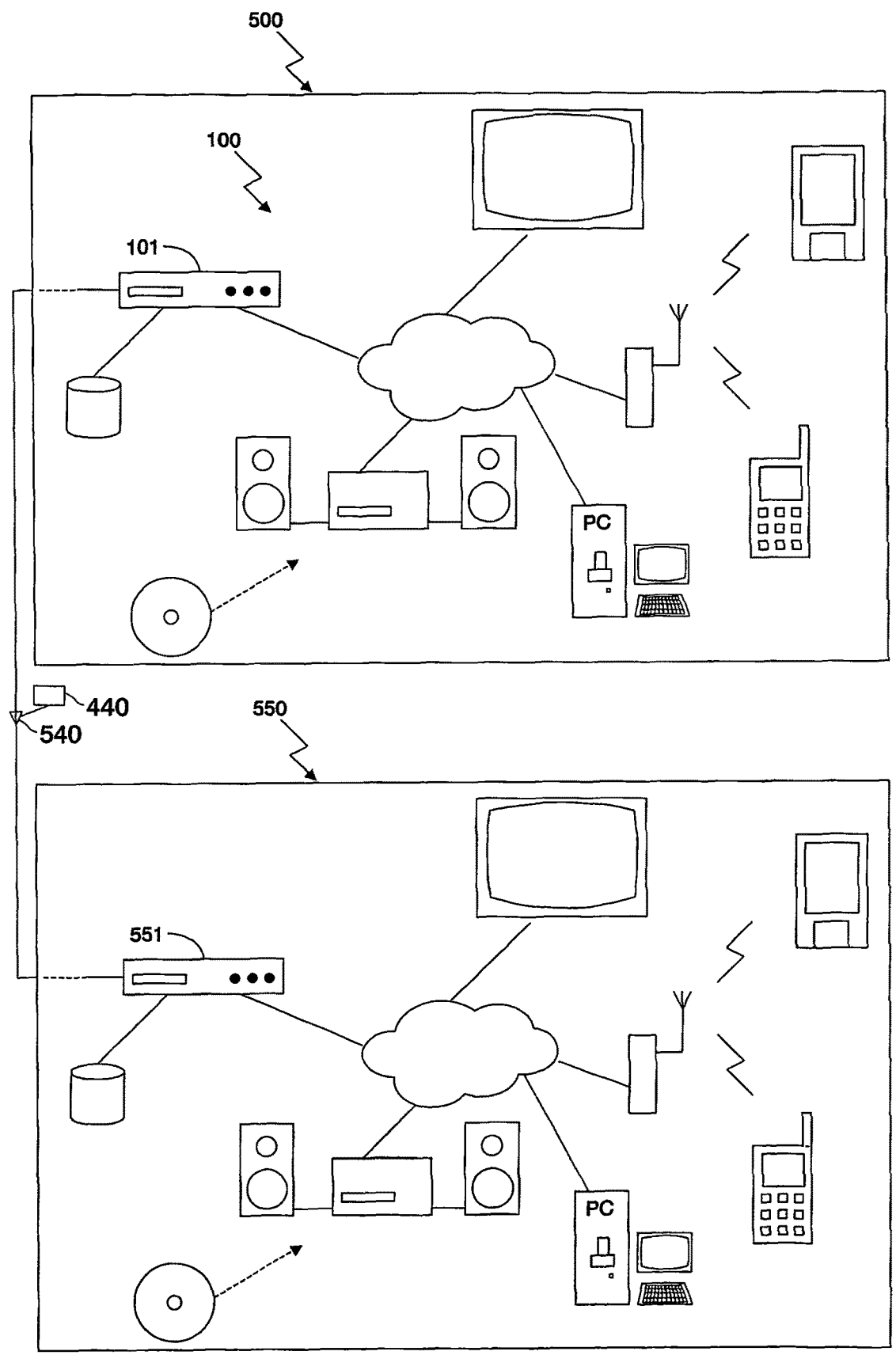
Figure 6:
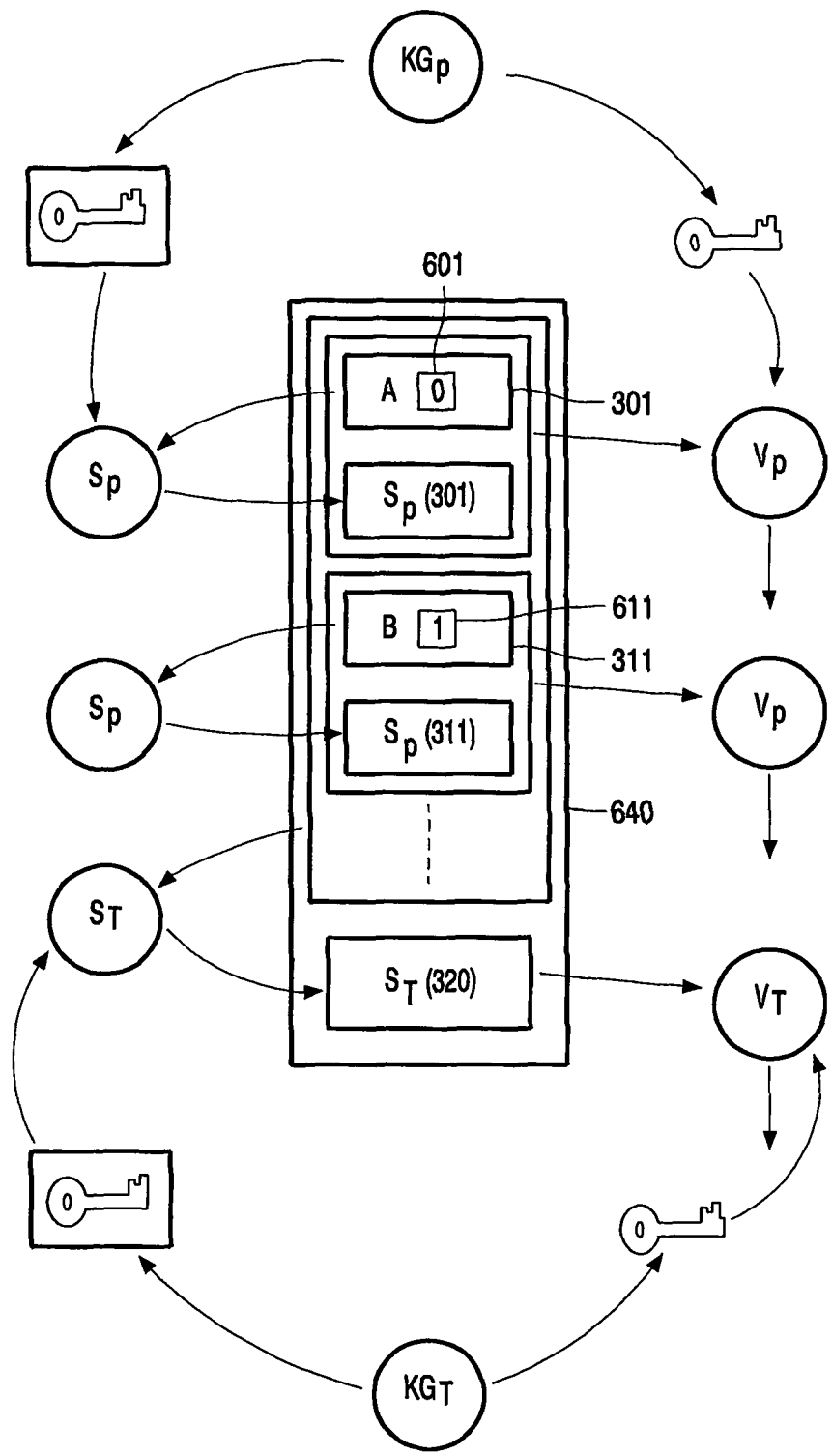
Figure 7:
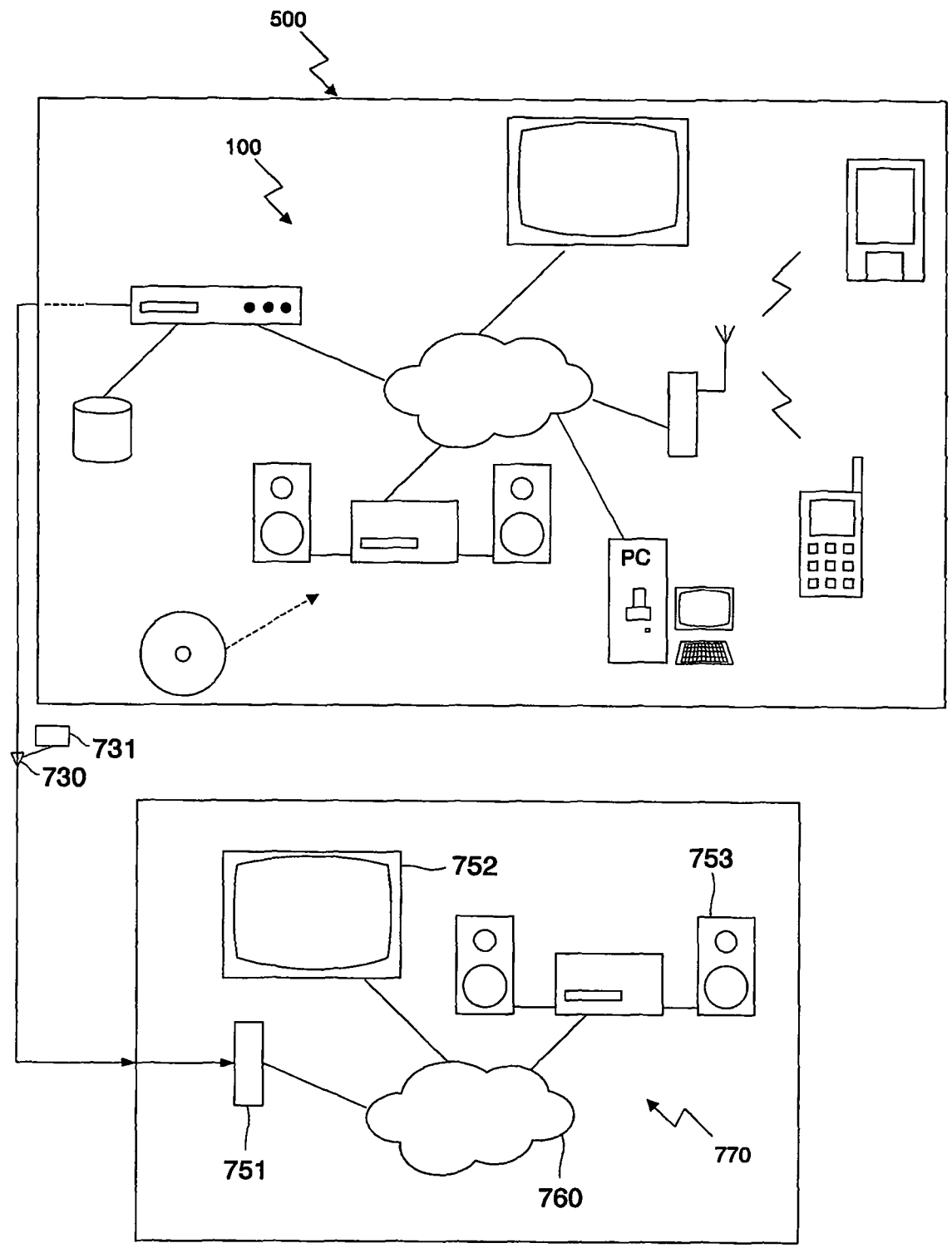
Figure 8:
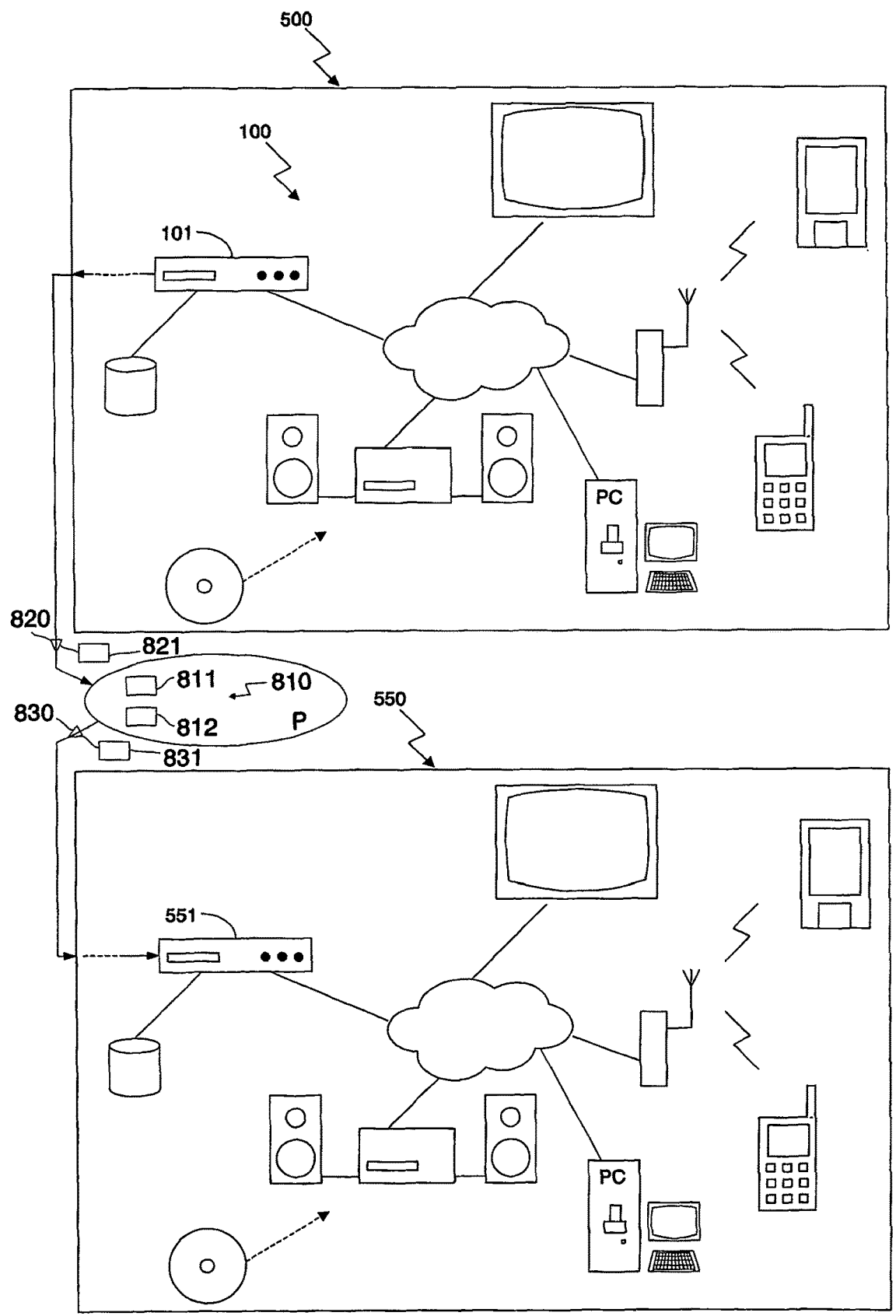

These and other aspects of the invention will be further described by way of example and with reference to the drawing, in which:

FIG. 1 schematically shows a system comprising devices interconnected via a network, FIG. 2 is a digitally signed right according to the prior art, FIG. 3 is a set of partial rights that are individually signed according to the current invention, FIG. 4 is a right that has been transferred and signed by the issuer according to the current invention, FIG. 5 shows the transfer of said right between two domains, FIG. 6 shows a field associated with each right to indicate the required protection level, FIG. 7 shows the communication of an individually signed right to a location outside the in-home network, and FIG. 8 shows an offer right being used to request the transfer of a usage right from a provider to a location outside the in-home network.

Throughout the figures, same reference numerals indicate similar or corresponding features. Some of the features indicated in the drawings are typically implemented in software, and as such represent software entities, such as software modules or objects.

FIG. 1 schematically shows an in-home network system 100. Such a system typically includes a number of devices, e.g. a radio receiver, a tuner/decoder, a CD player, a pair of speakers, a television, a VCR, a tape deck, a personal computer, and so on. These devices are usually interconnected to allow one device, e.g. the television, to control another, e.g. the VCR. One device, such as e.g. a tuner/decoder or a set top box (STB), is usually the central device, providing central control over the others.

Content 130, which typically comprises things like music, songs, movies, TV programs, pictures, programming guide information, and the like, is received for example through a PC 106 or a residential gateway or set top box 101. The source could be a connection to a broadband cable network, an Internet connection, a satellite downlink and so on. The set top box 101, or any other device in the system 100, may comprise a storage medium S1 such as a suitably large hard disk, allowing the recording and later playback of received content. The storage S1 could be a Personal Digital Recorder (PDR) of some kind, for example a DVD+RW recorder, to which the set top box 101 is connected. Content can also be provided to the system 100 stored on a carrier 120 such as a Compact Disk (CD) or Digital Versatile Disk (DVD). The content can then be transferred over the network 110 to a sink for rendering.

A sink can be, for instance, the television display 102, the portable display device 103, the mobile phone 104, and/or the audio playback device 105. The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

Under certain conditions a personal computer 106 could also operate as source, storage medium, and/or sink.

The portable display device 103 and the mobile phone 104 are connected wirelessly to the network 110 using a base station 111, for example using Bluetooth or IEEE 802.11b. The other devices are connected using a conventional wired connection. To allow the devices 101-106 to interact, several interoperability standards are available, which allow different devices to exchange messages and information and to control each other. One well-known standard is the Home Audio/Video Interoperability (HAVi) standard, version 1.0 of which was published in January 2000, and which is available on the Internet at the address http://www.havi.org/. Other well-known standards are the domestic digital bus (D2B) standard, a communications protocol described in EEC 1030 and Universal Plug and Play (http://www.upnp.org).

It is often important to ensure that the devices 101-106 in the home network do not make unauthorized copies of the content. To do this, a security framework, typically referred to as a Digital Rights Management (DRM) system is necessary. Such a system typically uses rights. Different type of rights are content rights and usage rights.

A content right describes what is allowed with said content, and a usage right authorizes a person to use a certain content right, and can also describe what a user is allowed to do with said content.

Example usage rights are a right to play content, a right to make a one generation copy, etc.

Both content rights and usage rights may also contain cryptographic keys.

Secure processing and storage of rights can be done in a tamper resistant module 108 which can be located for example in the central controller 101.

FIG. 2 shows how a usage right can be signed according to the prior art. The usage right could for example comprise a render right, a transfer right, a derivative work right, or a utility right. Some rights could have limited validity in time, or in number of times. In this example, a usage right 201 might contain a render right 202 which specifies that a user has play rights to a certain piece of content, and a transfer right 203 which specifies that the user has a right to transfer a certain amount of content to a different domain exactly two times. The signing process makes use of well-known public key encryption is based on the existence of a pair of a private key and a public key. The private key is kept secret by the party that signs and authenticates a message using this private key, and the corresponding public key can be distributed to and used by any third party in order to verify that the message has indeed been signed and not changed since it was signed by the originating party.

In this example, a private/public key pair generator 210 has generated a pair of a private key 211 and a public key 212 for the issuer of the usage rights, which can be the content provider itself whom we refer to as P. P uses its private key 211 during the signing process 213 of the usage right 201 and computes a signature 204. The combination of the usage right 201 and the signature 204 constitutes the signed usage right 205 which can be stored and transmitted without risk for undetected tampering. Any third party is able to perform a verification procedure 214 whether message 205 is authentic using the public key 212. The answer is available as output 215.

However, as only the issuer of the rights is able to sign such a usage right 201, a right from this set cannot be deleted or handled separately, as this would invalidate the signature 204. Partial rights that have been available outside the protection of secure environments can not reliably be revoked either, as there is no control over (illegal) copies of such a partial right.

The current invention makes it possible that the usage right can be handled without invalidating the digital signature.

In a first embodiment of the invention, the usage right 201 is decomposed into partial rights, which are subsequently signed individually.

FIG. 3 shows a set of individually signed partial rights 330 according to the current invention. It contains a number of example partial rights 301, 311, 321, and possibly more. In system 350 under control of P, partial rights are signed. Private key 351 of P is again used in process 353 to sign partial right 301 in order to compute signature 302. The same signing process 356 is used to compute P's signature 312 of partial right 311, and so on. These signed rights together with optionally other signed rights form a new set of individually signed partial rights 330. Each partial right can now be verified individually in the system 345 as in verification process 354, 357, and 360 to compute whether the signatures are valid (output 355, 358, and 361 respectively). This verification can be done by any device in the domain that has access to a partial right. Such a device may check whether the right has not been revoked by the issuer, or whether the issuer itself has not been revoked.

By treating the partial rights as a set, communication is minimized in size and number of transactions, and the conceptual relationship between the usage right and the content item is maintained.

Optionally, the complete set of individually signed partial rights 330 can be signed in process 373 as a whole to be able to verify completeness of the set of rights. Signing can be done again in a system 369 by the service provider but also, as shown in FIG. 3, by a different trusted third party T with its own private/public key pair 371/372 generated by key pair generator 370. Verification 374 yields the output answer 375 whether the signed set of rights 340 is complete.

An advantage of the first embodiment of the invention is that the partial rights are individually protected by a signature and can hence flow freely and independently within the domain. They can now individually be processed, e.g. revoked.

In a variation of the first embodiment, the complete set of individually signed partial rights can be signed in process 373 by the private/public key pair 371/372 of the receiver of the set of rights (e.g., the user) itself. The result can be sent back to, for example, the issuer of the set of rights. This can be part of a transaction, in order for the issuer to be able to prove that the complete set of rights has reached the intended receiver.

In a second embodiment of the invention, some or all of the signed partial rights are allowed to be transferred from a domain (the originating domain) to a different domain (the receiving domain).

FIG. 4 shows how a partial right, such as described in FIG. 3, is supplemented with additional information and signatures and subsequently signed to form a right to be transferred, further to be referred to as a transferable right. The transferable right is composed preferably from within the mentioned tamper resistant module, such as module 108 in FIG. 1. It contains the partial right 311, it further contains the original and still valid signature 312 created by the signing process 356 by P. In addition, metadata 411 is added containing information about but not limited to an identifier for the originating domain, an identifier for the receiving domain, the reason or purpose of transfer, time of transfer, and length of validity. For the identifier of the originating and receiving domain it is preferable to use their respective public keys. The partial right 311, the corresponding signature 312, and additional information 411 are composed together into information 430, and subsequently signed by the originating domain in process 463 with its own private key 461 to form signature 431. The transferable right 440 contains both information 430 and signature 431, and the validity and authenticity thereof can be verified in process 464 by any third party by using the public key 462 of the originating domain.

FIG. 5 shows two domains 500 and 550, both similar to system 100 in FIG. 1. It shows a transferable right 440 being transferred in process 540 outside domain 500, possibly using secure communication, to a different domain 550, preferably after the communicating devices 101 and 501 in the respective domains have verified each other to be compliant and not revoked. The originating domain 500 can locally revoke or delete the transferred right.

This embodiment of the invention has the further advantage that both the originating domain and the target domain of a transferred right can be reliably retrieved from the metadata and signatures contained in the transferable right. This enables tracking of content.

In a third embodiment of the invention, a distinguishment is made between different protection levels for different types of rights and their handling.

Some of the partial rights can be freely used within a domain, even outside the protection of encrypted transmission or secure storage, such as a local right to play a certain piece of content. These rights will be called "safe rights". Safe rights can flow freely within the authorized domain (AD). Other rights, such as a right to transfer a piece of content exactly once, have to be revoked or deleted immediately after having been used. These rights will be called "weak rights". Weak rights need protection from unauthorized duplication and tampering, and to enforce for example that they can only be issued a limited number of times. This protection can for example be provided by not allowing weak rights outside the protection of a secure environment, for example in a tamper resistant module (possibly in a central controller) that also takes care of the transfer of rights to a different domain. It is of course also possible to define more than two protection levels.

A potential method to indicate the level of minimum protection required for a certain right, is to add a field with said information. FIG. 6 shows a modified set of rights 640, similar to the signed set of individually signed partial rights 340 in FIG. 3. In its simplest form, an additional single bit field 601/611 indicates whether the rights 301/311 have to be constricted in secure storage. For example, right 301 could be a play right which does not require secure storage (example content in bit field 601 is 0), while right 311 requires secure storage (example content in bit field 611 is 1). Alternative methods to indicate the required minimum protection level include but are not limited to: a device makes a decision on the protection level acquired based on the type of right, or a device has an (updateable) list which indicates for each right the required protection level.

The minimum required protection level can be used to determine how the partial right should be handled.

In a fourth embodiment of the invention, the transfer of a right outside the domain, in order to (perhaps temporarily) extend the in-home network with a device located near the user/owner, is described. The extension can also be a device of a different owner who is entitled to access said content, as specified in the partial right or for other reasons (such as fair use).

In the European patent application having application number 02079390.7 an extension of the AD framework is described which allows a person to view or use his personal content remotely outside the original definition of in-home network, for example when traveling. In said application, security is obtained by the encryption of content, by the secure storage of the corresponding decryption keys, and by personalized usage rights which are protected by a signature created by a trusted third party.

In such a situation it is advantageous to be able to communicate only parts of the usage right, which is possible using the individual signatures according to the current invention. FIG. 7 illustrates the transfer process 730 of a transferable right 731 from a system 100 (as shown in FIG. 1), to a remote hotel television system 770 via a gateway 751 to, for example, an audio set 753 or a television 752 located near the authorized user. These devices can be located in a hotel room, lounge, etc.

In a fifth embodiment of the invention, the transfer rights are kept at the service provider and the owner communicates to the service provider that the right should be transferred to another person or domain.

To indicate the existence of the transfer rights, the offer right has been introduced in the text of this application.

In this case secure storage is not required to prevent unauthorized duplication as the service provider may monitor that only an allowed number of copies can be made.

FIG. 8 shows the use of an offer right by an in-home network system 100. During a communication process 820 an offer right 821 is sent to a provider 810 in order to request the transfer 830 of a usage right 831 to a system 550 outside the in-home network. The service provider may either keep the transfer rights in storage 811 or generate them with a generator 812 when required.

Alternatives are possible. In the description above, "comprising" does not exclude other elements or steps, "a" or "an" does not exclude a plurality, and a single processor or other unit may also fulfill the functions of several means recited in the claims.

The invention claimed is:

1. A method of operating a provider device of a content provider for controlling access to content items associated with usage rights, by a destination device, through a network, the method comprising the acts of:
   in the provider device:
   having content items associated with user rights, in a memory;
   generating by a right structure generator, respective usage rights comprising different respective portions of memory;
   associating by a central controller, the content items with the usage rights including modifying the respective memories of the associated usage rights by respective access control information for:
   accessing the respective content item; and
   representing the respective usage rights to authorize the access;
   decomposing by a decomposer, the usage rights into respective sets of multiple unsigned partial right structures, and the respective partial right structures:
   are associated with at least respective portions of respective content items;
   comprise respective portions of memory modified by respective access control information for authorizing the accessing the at least respective portions of the respective content items; and
   represent at least respective partial usage rights to allow the access;
   separately digitally signing by a digital signing part, the respective partial right structures of the sets of multiple unsigned partial rights, the signing resulting in corresponding sets of multiple respective signed partial rights that are individually verifiable; and
   providing, by a transfer element, from the memory, the content item and the set of signed partial rights to at least one destination device.

2. A client access system for a client access device to control access to content items associated with usage rights, by a plurality of client devices, through a network, the client system comprising:
   a plurality of client devices that are interconnected via a network;
   a client access device for controlling access to content items by the plurality of client devices associated with usage rights, through the network, the client access device includes:
   a central controller configured for controlling the client access device;
   a memory controlled by the central controller, that is configured to receive through the network from a source device into the memory, a content item and a set of multiple signed partial rights that are decomposed from at least one usage right:
   associated with the content item; and
   comprising a respective portion of memory modified by access control information representing usage rights to authorize the access;
   the respective partial right of the set of multiple signed partial rights:
   are associated with respective portions of the content item;
   comprising respective portions of memory modified by access control information representing respective partial usage rights decomposed from usage rights to access the content item; and
   are individually verifiable;
   a tamper resistant digital rights hardware module that communicates with the central controller and memory that grants access to portions of content by other client devices, and that is configured to:
   receive a request for access to at least a portion of the content item from a client device of the plurality of client devices of the network, into the memory, the request identifying the portion of the content item;
   identify at least one signed partial right, of the set of multiple signed partial rights, corresponding to the request;
   verify the identified at least one signed partial right, wherein respective partial right in the set of multiple signed partial rights are individually verifiable; and
   grant the request for access based on the verification of the identified at least one signed partial right.

3. The client access system of claim 2, wherein the tamper resistant digital rights hardware module is configured to revoke or delete or modify the at least one identified signed partial right or other access control information associated with the at least one identified signed partial right, depending on granting the request for access.

4. A client access device for controlling access to content items associated with usage rights, by plural client devices, through a network, the client access device comprising:
   a central controller configured for controlling the client access device;
   a memory controlled by the central controller, that is configured to receive through a network from a source device into the memory, a content item and a set of multiple signed partial rights that are:
   decomposed from at least one usage right, associated with the content item, comprising memory modified with access control information for accessing the associated content item and representing usage rights to authorize the access;
   associated with respective portions of the content item, and
   respective portions of memory modified by access control information representing respective partial usage rights decomposed from usage rights, the partial usage rights authorizing access to the associated portions of the content item;
a tamper resistant digital rights hardware module that communicates with the central controller and memory that grants access to portions of content by other client devices, and that is configured to:
receive a request for access to at least a portion of the content item from a destination device, into the memory, the request identifying the portion of the content item;
identify a signed partial right of the set of multiple signed partial rights corresponding to the request;
verify the identified signed partial right, wherein respective partial right in the set of multiple signed partial rights are individually verifiable; and
grant the request by the destination device for access to at least the portion of the content item, the grant based on the verification of the identified signed partial right.

5. The client access device of claim 4, wherein the tamper resistant digital rights hardware module is configured to revoke or delete or modify the at least one identified partial right or to delete or modify other access control information associated with the at least one identified partial right, depending on granting the request for access.

6. A client server device for controlling access through a network to content items associated with usage rights, by a destination device, through a network, the client server comprising:
a central controller configured for controlling the client server device;
a memory controlled by the central controller, that is configured to receive through the network from a source device into the memory, a content item and at least one usage right:
associated with the content item, and
comprising a respective portion of memory modified by access control information representing usage rights that authorize access to the content item;
a decomposer controlled by the central processor, configured to decompose the at least one usage right into a set of multiple respective unsigned partial rights that are:
associated with at least respective portions of the content item, and
comprised of respective portions of memory modified by access control information representing respective partial usage rights that authorize access to the portions of the content item;
a digital signing element that is configured to separately digitally sign the respective partial rights of the set of multiple partial right rights resulting in a corresponding set of multiple respective signed partial rights, wherein the signed partial rights in the set of multiple signed partial rights are individually verifiable, the partial usage rights being memory modified by information regarding partial usage rights that authorize access to the portions of the content item; and
a transfer element that is configured to transfer at least a portion of the content item from the memory through the network to a destination device.

7. The client server device of claim 6, wherein the source device is a provider device or another client server device and the destination device is a client access device or another client server device.

8. The client server device of claim 6, wherein the transfer element comprises a tamper resistant digital rights hardware module that grants access to portions of content by other client devices, that is configured to:
receive a request through the network for access to at least a portion of the content item from a client device of the plural client devices of the network;
identify at least one partial right of the set of multiple signed partial rights corresponding to the request;
verify the identified partial right, wherein respective partial rights in the set of multiple signed partial rights are respectively individually verifiable; and
grant the request for access based on the verification of the identified partial right.

9. The client server device of claim 8, wherein granting the request comprises:
initiating the transfer of at least a portion of the content item to the requesting device; and
deleting or revoking or modifying the identified partial right, or deleting or modifying information associated with the identified partial right, which identified partial right or associated information is stored in the memory of the client server.

10. The client server device of claim 6, wherein the tamper resistant digital rights hardware module is configured to revoke or delete or modify the at least one identified partial right or to delete or modify other access control information associated with the at least one identified partial right, depending on granting the request for access.

11. A client device for controlled access to content items associated with usage rights, through a network, comprising:
a central controller configured for controlling the client device;
a memory controlled by the central controller and configured for receiving information from a source device through the network into the memory and providing information from the memory to a destination device through the network; and
a tamper resistant digital right hardware module that communicates with the central controller and memory, that grants access to portions of content by other client devices, and that is configured to:
identify a portion of one content item to be accessed;
identify a signed partial right of a set of multiple signed partial rights, corresponding with the identified portion of the content item, wherein:
the set of multiple unsigned partial rights are decomposed from a usage right:
associated with the content item;
comprising memory modified by access control information
representing a usage right authorizing access to the content item; and
the respective partial rights:
are associated with respective portions of the content item;
comprise different respective portions of memory modified by respective access control information; and
represent respective partial usage rights: decomposed from usage rights that authorize access to the content item, and authorizing access to portions of the content item; and
the set of multiple unsigned partial rights are separately digitally signed resulting in the corresponding set of multiple signed partial rights that are individually verifiable;
request from the memory through a network, access to the determined at least one portion of the content item from a source device, the request including the identification of at least one partial right;

receive from the source device through the network into the memory, the determined at least a portion of a content item and the at least one signed partial right;

verify the at least one partial right; and access the at least a portion of the content item based on the verification of the identified partial right.

12. The client device of claim 11, wherein the tamper resistant digital rights hardware module, that grants access to portions of content by other client devices, is configured to:

receive a request from the central controller for accessing a portion of a content item;

identify a content item and set of signed partial rights from which the request can be satisfied;

request the identified content item and set of signed partial rights from a source device;

receive into the memory the content item and set of signed partial rights;

identify at least one partial right of the set of multiple signed partial rights corresponding to the received request;

verify the identified partial right, wherein respective partial rights in the set of multiple signed partial rights are respectively individually verifiable; and grant the request for access based on the verification of the identified partial right.

13. The client device of claim 11, wherein the tamper resistant digital rights hardware module, that grants access to portions of content by other client devices, is configured to:

receive a request from the central controller for accessing a portion of a content item;

request the identified content item from a source device;

receive into the memory the content item and a signed usage right;

verify the signed usage right;

decompose in a decomposer, the usage right associated with a content item into a set of multiple respective partial rights that are associated with at least respective portions of the content item;

identify at least one partial right of the set of multiple signed partial rights corresponding to the received request; and grant the received request for access based on the verification of the identified partial right.

14. The client device of claim 11, wherein the tamper resistant digital rights hardware module is configured to revoke or delete or modify the at least one identified partial right or to delete or modify other access control information associated with the at least one identified partial right, depending on granting the request for access.

15. The client device of claim 11, wherein the source device is a provider device or a client server device or a client access device.

16. A client device for controlled access to content items associated with usage rights, through a network, comprising:

a central controller configured for controlling the client device;

a memory controlled by the central controller and configured for receiving information from a source device through the network into the memory and providing information from the memory to a destination device through the network; and a tamper resistant digital right hardware module that communicates with the central controller and memory, that grants access to portions of content by other client devices, and that is configured to:

receive a request from the central controller for accessing a portion of a content item;

request the content item from a source device;

receive into the memory the content item and a signed usage right:

associated with the content item;

comprising memory modified by access control information to access the content item; and representing usage rights to allow the access;

verify the signed usage right;

decompose in a decomposer, the usage right associated with a content item into a set of multiple respective partial rights that are associated with at least respective portions of the content item;

identify at least one partial right of the set of multiple signed partial rights corresponding to the received request; and grant the received request for access to the portion of the content item based on the verification of the identified partial right.

17. A provider device for controlling access to a content items associated with usage rights, by a destination device, through a network, the provider device comprising:

a memory configured for storing content;

a rights generator configured for generating usage rights in the memory, the usage rights being memory modified by access control information representing usage rights that authorize access to the content;

a central controller configured for associating usage rights in memory with respective content in the memory;

a decomposer configured for decomposing a usage right of the usage rights, the user rights associated with a content item of the content, into a set of multiple respective partial rights that are associated with at least respective portions of the content item;

a digital signing part configured for separately digitally signing the respective partial rights of the set of multiple partial rights, resulting in a corresponding set of signed partial rights, the unsigned and signed partial rights being memory modified by access control information representing respective partial usage rights decomposed from usage rights to access the content item, the signed partial right being individually verifiable; and the memory is configured for providing the content item and the set of signed partial right to a destination device over the network.

18. A method of operating a client access device for controlling access to a content item associated with usage rights, by one or more client devices, through a network, the client access device comprising:

controlling by a central controller, the client access device;

receiving into a memory from a source device, a content item and a set of multiple signed partial rights that are:

decomposed from at least one usage right, associated with the content item, comprising memory modified with access control information for accessing the associated content item and representing usage rights to authorize the access to the content item;

associated with respective portions of the content item, and respective portions of memory modified by access control information representing respective partial usage rights decomposed from usage rights, the partial usage rights authorizing access to the associated portions of the content item;

a tamper resistant digital rights hardware module communicating with the central controller and memory, that grants access by other client devices to portions of content, to:

receive a request for access to at least a portion of the content item from another client device of the plurality of client devices of the network, into the memory, the request identifying the portion of the content item;

identify a signed partial right of the set of multiple signed partial rights corresponding to the request;

verify the identified signed partial right, wherein respective partial rights in the set of multiple signed partial rights are individually verifiable; and grant the request for access to at least the portion of the content item, the grant based on the verification of the identified signed partial right.

19. A method of operating a client server device for controlling access to a content item associated with usage rights, by a destination device, through a network, the method comprising the acts of:

controlling by a central controller, the client server device;

storing in a memory a content item and at least one usage right: associated with the content item, and comprising a respective portion of memory modified by access control information representing usage rights that authorize access to the content item;

decomposing in a decomposer, the at least one usage right into a set of multiple respective partial rights into a set of multiple respective unsigned partial rights that are:
associated with at least respective portions of the content item, and
comprised of respective portions of memory modified by access control information representing respective partial usage rights that authorize access to the portions of the content item;

separately digitally signing in a digital signing element, respective partial right structures of the set of multiple partial right structures resulting in a set of multiple respective signed partial right structures that are individually verifiable; and transferring by a transfer element, at least a portion of the content item to another device.

20. A method of operating a client device for accessing a content item associated with a usage right, from a source device, through a network, the client device comprising:

controlling by a central controller, the client device;

receiving information from a source device through the network into a memory controlled by the central controller and providing information from the memory to a destination device through the network; and communicating by a tamper resistant digital right hardware module with the central controller and memory, including granting access to portions of content by other client devices, to:

identify a portion of one content item to be accessed;

identify a signed partial right of a set of multiple signed partial rights, corresponding with the identified portion of the content item, wherein:
the set of multiple unsigned partial rights are decomposed from a usage right:
associated with the content item;
comprising memory modified by access control information
representing a usage right authorizing access to the content item; and the respective partial rights:
are associated with respective portions of the content item;
comprise different respective portions of memory modified by respective access control information; and
represent respective partial usage rights: decomposed from usage rights that authorize access to the content item, and authorizing access to portions of the content item; and the set of multiple unsigned partial rights are separately digitally signed resulting in the corresponding set of multiple signed partial rights that are individually verifiable;

request from the memory through a network, access to the determined at least one portion of the content item from a source device, the request including the identification of at least one partial right;

receive from the source device through the network into the memory, the determined at least a portion of a content item and the at least one signed partial right;

verify the at least one partial right; and access at least the portion of the content item based on the verification of the identified partial right.

21. A tangible computer-readable storage-medium that is not a transitory propagating signal or wave, the medium modified by control information including instructions for performing a method of operating a provider device for controlling access through a network to a content item associated with usage rights, the method comprising:

in the provider device:
having content items associated with user rights, in a memory;

generating by a right structure generator, respective usage rights comprising different respective portions of memory;

associating by a central controller, the content items with the usage rights including modifying the respective memories of the associated usage rights by respective access control information for:
accessing the respective content item; and
representing the respective usage rights to authorize the access;

decomposing by a decomposer, the usage rights into respective sets of multiple unsigned partial right structures, and the respective partial right structures:
are associated with at least respective portions of respective content items;
comprise respective portions of memory modified by respective access control information for authorizing the accessing the at least respective portions of the respective content items; and
represent at least respective partial usage rights to allow the access;

separately digitally signing by a digital signing part, the respective partial rights of the sets of multiple unsigned partial rights, the signing resulting in corresponding sets of multiple respective signed partial rights that are individually verifiable; and providing, by a transfer element, from the memory, the content item and the set of signed partial rights to at least one destination device.

22. A tangible computer-readable storage-medium that is not a transitory propagating signal or wave, the medium modified by control information including instructions for performing a method of operating a client access device for controlling access to a content item associated with usage rights, by one or more client devices, through a network, the client access device comprising:
controlling by a central controller, the client access device;
receiving into a memory from a source device, a content item, and a set of multiple signed partial rights that are:
decomposed from at least one usage right, associated with the content item, comprising memory modified with access control information for accessing the associated content item and representing usage rights to authorize the access to the content item;
associated with respective portions of the content item, and
respective portions of memory modified by access control information representing respective partial usage rights decomposed from usage rights, the partial usage rights authorizing access to the associated portions of the content item;
a tamper resistant digital rights hardware module communicating with the central controller and memory, that grants access by other client devices to portions of content, to:
receive a request for access to at least a portion of the content item from another client device of the plurality of client devices of the network, into the memory, the request identifying the portion of the content item;
identify a signed partial right of the set of multiple signed partial rights corresponding to the request;
verify the identified signed partial right, wherein respective partial rights in the set of multiple signed partial rights are individually verifiable; and
grant the request for access to at least the portion of the content item, the grant based on the verification of the identified signed partial right.

23. A tangible computer-readable storage-medium that is not a transitory propagating signal or wave, the medium modified by control information including instructions for performing a method of operating a client server device for controlling access to a content item associated with usage rights, by a destination device, through a network, the method comprising the acts of:
controlling by a central controller, the client server device;
storing in a memory a content item and at least one usage right: associated with the content item, and comprising a respective portion of memory modified by access control information representing usage rights that authorize access to the content item;
decomposing in a decomposer, the at least one usage right into a set of multiple respective partial rights into a set of multiple respective unsigned partial rights that are:
associated with at least respective portions of the content item, and
comprised of respective portions of memory modified by access control information representing respective partial usage rights that authorize access to the portions of the content item;
separately digitally signing in a digital signing element, respective partial rights of the set of multiple partial rights resulting in a set of multiple respective signed partial rights that are individually verifiable; and
transferring by a transfer element, at least a portion of the content item to another device.

24. A tangible computer-readable storage-medium that is not a transitory propagating signal or wave, the medium modified by control information including instructions for performing a method of operating a client device for accessing a content item associated with a usage right, from a source device, through a network, the client device comprising:
controlling by a central controller, the client device;
receiving information from a source device through the network into a memory controlled by the central controller and providing information from the memory to a destination device through the network; and
communicating by a tamper resistant digital right hardware module with the central controller and memory, including granting access to portions of content by other client devices, to:
identify a portion of one content item to be accessed;
identify a signed partial right of a set of multiple signed partial rights, corresponding with the identified portion of the content item, wherein:
the set of multiple unsigned partial rights are decomposed from a usage right:
associated with the content item;
comprising memory modified by access control information
representing a usage right authorizing access to the content item; and
the respective partial rights:
are associated with respective portions of the content item;
comprise different respective portions of memory modified by respective access control information; and
represent respective partial usage rights: decomposed from usage rights that authorize access to the content item, and authorizing access to portions of the content item; and
the set of multiple unsigned partial rights are separately digitally signed resulting in the corresponding set of multiple signed partial rights that are individually verifiable;
request from the memory through a network, access to the determined at least one portion of the content item from a source device, the request including the identification of at least one partial right;
receive from the source device through the network into the memory, the determined at least a portion of a content item and the at least one signed partial right;
verify the at least one partial right; and
access the at least a portion of the content item based on the verification of the identified partial right.

25. The client access device of claim 4, wherein the source device is a provider device or a client server device, and the destination device is a client device.

26. The client device of claim 10, wherein the source device is a provider device or a client server device or a client access device.

27. The client device of claim 11, wherein for respective signed partial rights the respective access control information comprises at least one of the group of:

a key for decoding the portion of the content item associated with the signed partial right representing the granted partial right;
a time duration of the partial right;
an expiration date of the partial right;
a digital usage rights certificate;
a maximum number of times that the partial right can be executed; and
a number that can be modified when the represented right is executed.

28. The client device of claim 11, wherein a partial right represented by a corresponding signed partial right of the set of multiple signed partial rights associated with at least a portion of the content item, comprises at least one of the group of: a render right, a transfer right, an offer right, a derivative work right, and a utility right.

29. The client device of claim 11, wherein a partial right represented by a corresponding signed partial right of the set of multiple signed partial rights associated with at least a portion of the content item, can only be exercised a limited number of times.

30. The client device of claim 11, wherein the tamper resistant digital rights hardware module is further configured to verify whether the at least one partial right and an authorization structure of the provider have both not been revoked before granting the request for access based on verification of the signed partial right.

31. The client device of claim 11, wherein a required protection level of at least one partial right of the set of partial rights is indicated along with the at least one partial right.

32. The client device of claim 11, wherein at least one partial right structure of the set of signed partial rights has a type, and a required protection level of the at least one partial right is derived implicitly from the type of the at least one partial right.

33. The client server device of claim 6, wherein for respective signed partial rights the respective access control information comprises at least one of the group of:
a key for decoding the portion of the content item associated with the signed partial right representing the granted partial right;
a time duration of the partial right;
an expiration date of the partial right;
a digital usage rights certificate;
a maximum number of times that the partial right can be executed; and
a number that can be modified when the represented right is executed.

34. The client server device of claim 6, wherein a partial right represented by a corresponding signed partial right of the set of multiple signed partial rights associated with at least a portion of the content item, comprises at least one of the group of: a render right, a transfer right, an offer right, a derivative work right, and a utility right.

35. The client server device of claim 6, wherein a partial right represented by a corresponding signed partial right of the set of multiple signed partial rights associated with at least a portion of the content item, can only be exercised a limited number of times.

36. The client server device of claim 6, wherein the tamper resistant digital rights hardware module is further configured to verify whether the at least one partial right and an authorization structure of the provider have both not been revoked before granting the request for access based on verification of the signed partial right.

37. The client server device of claim 6, wherein a required protection level of at least one partial right of the set of partial rights is indicated along with the at least one partial right.

38. The client server device of claim 6, wherein at least one partial right of the set of signed partial rights has a type, and a required protection level of the at least one partial right is derived implicitly from the type of the at least one partial right.

39. The client server device of claim 6, wherein the destination device is able to exercise at least one partial right corresponding to a signed partial right of the set of multiple signed partial rights only after verification of the signed partial right to access at least an associated portion of the content item.

40. The client server device of claim 6, wherein the destination device is configured by the client device to restrict the destination device to only allow the destination device to sign at least one partial right, the restriction being in the signed partial right.

41. The client server device of claim 6, wherein, the destination device is configured by the client device to verify by the destination device, that the at least one partial right is at least one of the group of compliant and being non-revoked.

42. The client server device of claim 6, wherein the delivery to the destination device includes at least one usage right that comprises control information regarding an offer right for a specific right, and
the destination device is configured to request that the provider device execute the offer right and deliver the specific right to a specified third party device, and
the provider device is configured to deliver the specific right directly to the specified third party device.

43. The client server device of claim 6, wherein the at least one destination device comprises a set of devices within a client system, and at least a subset of devices from the set of devices within the client system are grouped as a domain within the client system of devices.

44. The client server device of claim 43, wherein the domain of associated devices are related to one a household or a limited group of consumers.

45. The client server device of claim 43, whereby the destination device is further configured by the client server device to:
identify a different device,
transmit information that includes at least one partial right of the set of signed partial rights and at least one of the group of: an identification of the domain, an identification of the different device, and information about length, and validity of the partial right, to create a signed information item,
and transfer this signed information item to the different device.

46. The client server device of claim 45, wherein the different device is a member of a different domain than the domain of the client server device.

47. The client server device of claim 45, whereby the destination device is further configured by the client server device to revoke or delete or modify the at least one partial right by the device, after the transfer to the different device.

48. The client server device of claim 45, whereby the different device is configured to verify that the device is at least one of being compliant and being non-revoked.

49. The provider device of claim 17, wherein for respective signed partial rights the respective access control information comprises at least one of the group of:

a key for decoding the portion of the content item associated with the signed partial right representing the granted partial right;
a time duration of the partial right;
an expiration date of the partial right;
a digital usage rights certificate;
a maximum number of times that the partial right can be executed; and
a number that can be modified when the represented right is executed.

50. The provider device of claim 17, wherein a partial right represented by a corresponding signed partial right of the set of multiple signed partial rights associated with at least a portion of the content item, comprises at least one of the group of: a render right, a transfer right, an offer right, a derivative work right, and a utility right.

51. The provider device of claim 17, wherein a partial right represented by a corresponding signed partial right structure of the set of multiple signed partial right structures associated with at least a portion of the content item, can only be exercised a limited number of times.

52. The provider device of claim 17, wherein a required protection level of at least one partial right of the set of partial rights is indicated along with the at least one partial right.

53. The provider device of claim 17, wherein at least one partial right of the set of signed partial rights has a type, and a required protection level of the at least one partial right is derived implicitly from the type of the at least one partial right.

54. The provider device of claim 17, wherein the destination device is able to exercise at least one partial right corresponding to a signed partial right of the set of multiple signed partial rights only after verification of the signed partial right to access at least an associated portion of the content item.

55. The provider device of claim 17, wherein the destination device is configured to only allow the signing of at least one partial right, the restriction being in the signed partial right.

56. The provider device of claim 17, wherein the destination device is configured to verify that the at least one partial right is at least one of the group of compliant and being non-revoked.

57. The provider device of claim 17,
wherein the delivery to the destination device includes at least one usage right that comprises control information regarding an offer right for a specific right, and:
wherein the destination device is configured to request the provider device to execute the offer right and deliver the specific right to a specified third party device, and
wherein delivery by the provider device of the specific right is made directly to the specified third party device.

58. The provider device of claim 17, wherein the at least one destination device comprises a set of devices within a client system, and at least a subset of devices from the set of devices within the client system are grouped as a domain within the client system of devices.

59. The provider device of claim 58, wherein the domain of associated devices are related to one a household or a limited group of consumers.

60. The provider device of claim 58, wherein the provider device configures the destination device to:
identify a different device,
signal information that includes at least one partial right of the set of signed partial rights and at least one of the group of: an identification of the domain, an identification of the different device, and information about length, and validity of the partial right, to create a signed information item,
and transfer this signed information item to the different device.

61. The provider device of claim 60, wherein the different device is a member of a different domain than the domain of the provider device.

62. The provider device of claim 60, wherein the provider device configures the destination device to one of revoke or delete or modify the at least one partial right by the device, after the transfer to the different device.

63. The provider device of claim 60, wherein the different device is configured to verify that the device is at least one of being compliant and being non-revoked.

* * * * *